(12) United States Patent
Budko et al.

(10) Patent No.: US 8,336,079 B2
(45) Date of Patent: Dec. 18, 2012

(54) INTELLIGENT SECURITY CONTROL SYSTEM FOR VIRTUALIZED ECOSYSTEMS

(75) Inventors: Renata Budko, Sunnyvale, CA (US); Hemma Prafullchandra, Mountain View, CA (US); Eric Ming Chiu, Los Altos, CA (US); Boris Strongin, Redwood City, CA (US)

(73) Assignee: Hytrust, Inc., Mountain View, CA (US)

( * ) Notice: Subject to any disclaimer, the term of this patent is extended or adjusted under 35 U.S.C. 154(b) by 595 days.

(21) Appl. No.: 12/347,315

(22) Filed: Dec. 31, 2008

(65) Prior Publication Data

US 2010/0169948 A1    Jul. 1, 2010

(51) Int. Cl.
*G06F 17/00* (2006.01)
(52) U.S. Cl. ............................................................ 726/1
(58) Field of Classification Search ........ 726/1; 713/189
See application file for complete search history.

(56) References Cited

U.S. PATENT DOCUMENTS

| | | | |
|---|---|---|---|
| 2002/0069369 A1* | 6/2002 | Tremain ......................... | 713/201 |
| 2002/0169987 A1* | 11/2002 | Meushaw et al. .............. | 713/201 |
| 2003/0126468 A1* | 7/2003 | Markham ...................... | 713/201 |
| 2004/0030913 A1* | 2/2004 | Liang et al. .................... | 713/200 |
| 2005/0210467 A1 | 9/2005 | Zimmer et al. | |
| 2005/0257267 A1* | 11/2005 | Williams et al. ................ | 726/25 |
| 2007/0073858 A1* | 3/2007 | Lakshmi Narayanan et al. ............. | 709/223 |
| 2007/0078988 A1* | 4/2007 | Miloushev et al. ........... | 709/227 |
| 2007/0118350 A1 | 5/2007 | Van Der Made | |
| 2008/0098309 A1* | 4/2008 | Fries et al. .................... | 715/734 |
| 2008/0256538 A1 | 10/2008 | Carter et al. | |

OTHER PUBLICATIONS

Hytrust, Inc. et al., PCT/US2009/051995 filed Jul. 28, 2009; International Search Report and Written Opinion; ISA/KR; Feb. 24, 2010; 9pp.
Hytrust, Inc. et al., PCT/US2009/051590 filed Jul. 23, 2009; International Search Report; ISA/KR; Feb. 23, 2010; 3pp.
Charu Chaubal, VMware Infrastructure 3, Security Hardening, 2007, 19 pp, Palo Alto, USA.
Michael Hilker, Next Challenges in Bringing Artificial Immune Systems to Production in Network Security, Bionetics 2007 Dec. 10-12, 2001, Budapest, Hungary, 7 pp.
VMware ESX Server 3.x Benchmark—Version 1.0, The Center for Internet Security, Oct. 2007, 70pp.
VMware, VMware ESX Server 3-Best Practices for VMWare ESX Server 3, VMware White Paper, Copyright 1998-2006, 13pp, Palo Alto, USA.
National Security Agency, VMware ESX Server 3 Configuration Guide, Enterprise Applications Division of the Systems and Network Analysis Center (SNAC)—Information Assurance Directorate, Mar. 3, 2008, 26 pp, Ft. Meade, USA.
Intel Technology Journal, Autonomic Computing, vol. 10, Issue 04, Published Nov. 9, 2006, 84 pp.
Hytrust, Inc. et al., PCT/US2009/051590, filed Jul. 23, 2009; Written Opinion; ISA/KR; Feb. 23, 2010; 3 pp.

* cited by examiner

*Primary Examiner* — Kambiz Zand
*Assistant Examiner* — Abiy Getachew
(74) *Attorney, Agent, or Firm* — Tarek N. Fahmi, APC

(57) ABSTRACT

Resources of a virtualized ecosystem are intelligently secured by defining and analyzing object handling security control information for one or more logical resources in the virtualized ecosystem and deriving therefrom object properties for each of the logical resources involved in the execution of a virtual machine in any given context within the virtualized ecosystem.

41 Claims, 9 Drawing Sheets

INTELLIGENT SECURITY CONTROL SYSTEM FOR VIRTUALIZED ECOSYSTEMS

FIELD OF THE INVENTION

The present invention relates to a security control system adapted to define and analyze object handling control information, for example, control information that may influence or impact security and compliance of a virtualized ecosystem and derive from it object properties for each of a number of logical resources involved in the execution of a virtual machine in any given context within the virtualized ecosystem.

BACKGROUND

Virtualization is a term that has been coined to refer to the abstraction of computer resources. This includes abstraction of both hardware and software at multiple levels, from individual servers and clients to storage to complete networks. In this latter instance, the term "virtual infrastructure" has been used to refer to abstracted resources of a computer network, inclusive of all the hardware and software. Virtualization thus transforms physical hardware and software resources into virtual machines (and other virtual objects) that are capable of running their own operating systems and applications across any of a variety of platforms. Virtualization also allows the packaging of complete operating system and applications as a portable virtual environment (also referred to as encapsulation), which can be moved from one virtualization platform to another (regardless of vendor).

Among the many benefits afforded by virtualization technology are increased flexibility and reduced cost of infrastructure management largely driven by encapsulation and portability inherent to virtual machines. With the benefits of visualization, however, come several serious security risks. Because virtual infrastructures can now be managed remotely through software, controls that existed in the pre-virtualization world are now relaxed or bypassed altogether. Users with access to software management facilities now can create copies of the virtual machine disks with sensitive data, cause denial of service to an important application by starving it of resources or accidentally connecting a critical virtual machine to an insecure network. More malicious attacks are also possible. Indeed, the data of virtualization applications, both run-time and its associated data set, need to be protected as it represents base hardware structures in relation to executing payload of the operating system and application. Moreover, the portability of virtual machines and the fact that the application/data reader is encapsulated together with the data, invalidates data protection methodologies of separation that rely on the security of physical storage devices.

Dynamic allocation of physical and logical resources for each instantiated virtual machine requires that every resource provider be defined separately with its own access and allocation rules; creating a multi-node service provider access system as compared to legacy environment where a physical system with processor, memory, storage and network resources was a single bundled service provider. Moreover, the rate of change of the virtualized system makes it impractical to require human intervention when adjusting the access and allocation rules with every change. To be useful, the controls need to have higher level of abstraction and generalization. Further, persistence, inheritance and tight coupling between the data set and the associated controls are important as the data set routinely migrates and/or survives specific physical environments or virtualized environments.

These and other considerations demand that virtualized resources be placed under the control of stringent security facilities.

SUMMARY OF THE INVENTION

The present invention address the above-described concerns by providing, in one embodiment, a security control system adapted to define and analyze object handling control information, for example, control information that may influence or impact security and compliance of a virtualized ecosystem and derive from it object properties for each of a number of logical resources involved in the execution of a virtual machine in any given context within the virtualized ecosystem.

In one embodiment of the invention, resources of a virtualized ecosystem are secured by defining and analyzing object handling control information for one or more logical resources in the virtualized ecosystem and deriving therefrom object properties for each of the logical resources involved in the execution of a virtual machine in any given context within the virtualized ecosystem. Deriving object properties in such a scheme may involve defining, managing and enforcing controls for interactions amongst the logical resources and their interactions with an underlying physical, computer-based environment abstracted by the virtualized ecosystem. Further, the controls may be evaluated in response to an attempt to manipulate one or more of the logical resources and prescribed behavior for the logical controls may be enforced according to a context within which the attempted manipulation is being performed and one or more properties of the logical resources.

In some cases, logical and physical objects of the virtualized ecosystem may be categorized so that objects with similar properties are grouped together and a taxonomy of allowed hierarchical relationships of these groupings may define higher groupings thereof. In such instances, controls may be defined for the groupings within the taxonomy of allowed hierarchical relationships. Such taxonomies of allowed hierarchical relationships may be learned from the virtualized ecosystem and/or imported from existing systems and subsequently augmented.

The properties of the logical resources and the underlying physical, computer-based environment, which make up the virtualized ecosystem may, in some cases, be automatically discovered through available interfaces and management clients for the virtualized ecosystem. Further, the controls may be embedded as control blocks within the logical resources, and, as such, may dictate where, when, how and using what resources the logical resources can operate within the virtualized ecosystem. Logical resources at rest in the virtualized ecosystem may be encrypted according to a varying level of protection that depends on an environmental context of the logical resources.

The controls may be enforced after being validated, for example by verifying digital signatures associated with the controls. Such enforcement may then be achieved by evaluating intentions specified in the controls, operations on the logical resources being performed and environments in which they are being performed. In some cases, the control information will include control information that influences or impacts security of the virtualized ecosystem. For example, the control information may be security and compliance control information.

A further embodiment of the invention includes a system made up of a virtual infrastructure and a security control system communicatively coupled thereto. The security control system may be configured for securing resources of the virtual infrastructure by defining and analyzing object handling control information for one or more logical resources in the virtual infrastructure and deriving therefrom object properties for each of the logical resources involved in the execution of one or more virtual machines in any given context within the virtual infrastructure. The virtual machines may execute on one or more virtualization platforms, at least some of which have associated security control system agents for communication with the security control system. The virtual infrastructure may also include a storage system used by at least some of virtual machines, and the storage system may have its own associated security control system agent. In other cases, some of the components of the virtual infrastructure may communicate with the security control system through one or more management clients or interfaces.

The virtual infrastructure abstracts an underlying physical, computer-based environment and the security control system is, in some instances, configured to define, manage and enforce controls for interactions amongst the logical resources and their interactions with the computer-based environment. For example, the security control system may be configured to evaluate the controls in response to attempts to manipulate one or more of the logical resources and to enforce prescribed (or learned) behavior for the controls according to a context within which the attempted manipulation is being performed and one or more properties of the logical resources. For new virtual objects or new contexts, the present security control system dynamically generates controls based on learned controls that are enforced for similar/like objects or contexts and automatically enforces them, thus preventing any security or compliance breaches. Logical and physical objects of the virtual infrastructure may be categorized so that objects with similar properties are grouped together and a taxonomy of allowed hierarchical relationships of these groupings defines higher groupings thereof and the controls may be defined for the groupings within the taxonomy of allowed hierarchical relationships.

Still further embodiments of the present invention provide for protecting a virtual machine by establishing a lock on the virtual machine and its associated virtual disk files; determining a required level of protection for the virtual machine and encryption tuning parameters; selecting a cipher algorithm and generating encryption keys according to the encryption tuning parameters; applying re-formatting changes, if needed; encrypting sectors of data based on the determined level of protection; encrypting a symmetric encryption key with an asymmetric public key, and adding metadata along with the encrypted symmetric key into the virtual machine.

The protected virtual machine may be un-protected by retrieving metadata from a protected virtual machine disk file; retrieving identity and/or location information of an associated protected asymmetric private key; decrypting a symmetric encryption key using the unprotected asymmetric private key; and decrypting the protected virtual machine disk file with the symmetric encryption key. The identity and/or location of the protected asymmetric private key may be codified as a uniform resource locator (URL). The protection of the asymmetric private key may be provided by a user password-based encryption scheme or a security hardware module.

Still another embodiment of the invention involves evaluating and enforcing controls for attempted manipulations of virtual objects in a virtualized ecosystem according to a context within which the attempted manipulations are being performed and the properties of the virtual objects. The controls are embedded within the virtual objects and may include entitlements and access/use policies for the virtual objects.

These and other features of the present invention are described in greater detail below.

BRIEF DESCRIPTION OF THE DRAWINGS

The present invention is illustrated by way of example, and not limitation, in the figures of the accompanying drawings in which.

DETAILED DESCRIPTION

Described herein is a security control system adapted to define and analyze object handling control information, for example, control information that may influence or impact security and compliance of a virtualized ecosystem and derive from it object properties for each of a number of logical resources involved in the execution of a virtual machine in any given context within the virtualized ecosystem. Before discussing this system in detail, however, some introduction to virtualized ecosystems is appropriate.

Figure 1:
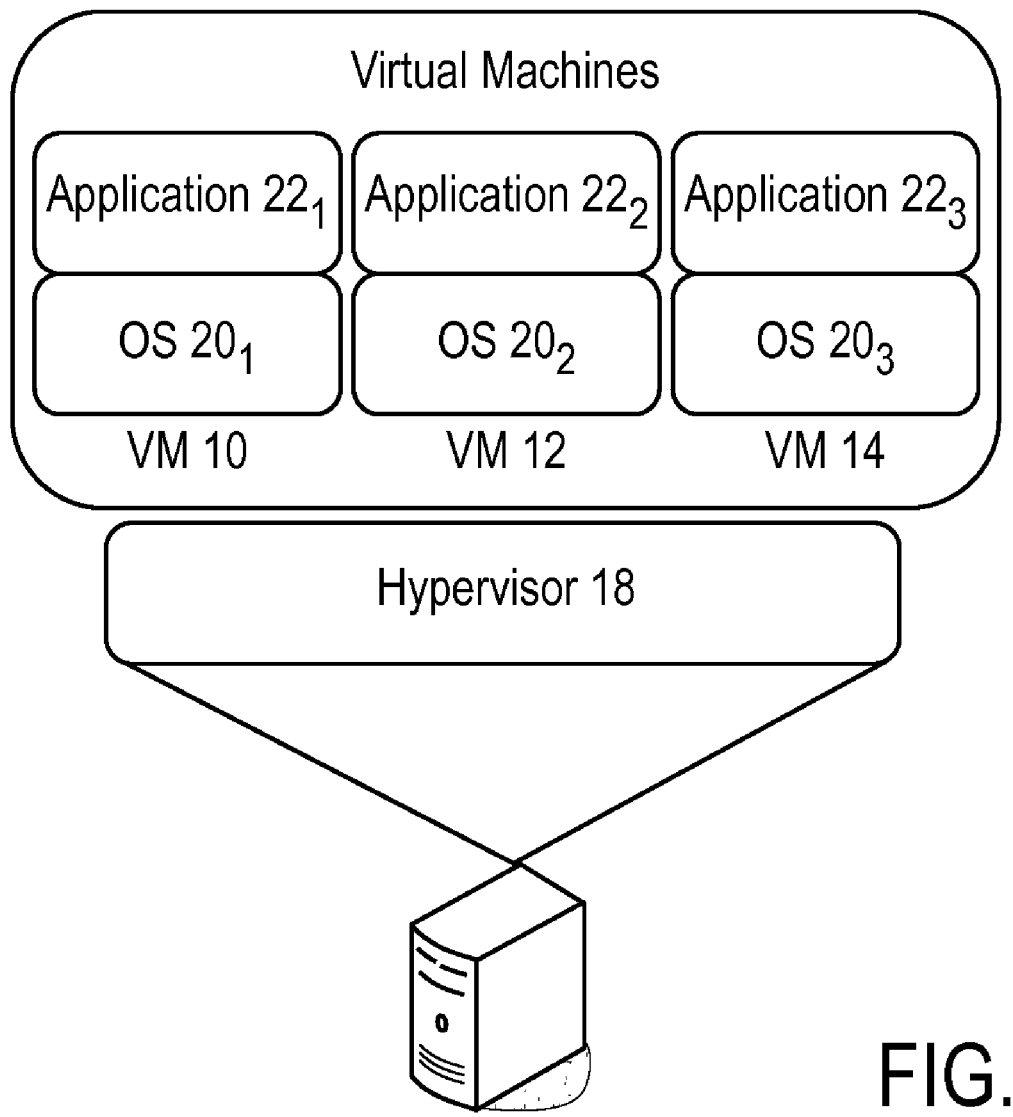
FIG. 1 illustrates an example of several virtual machines executing on a server.

FIG. 1 illustrates an example of three virtual machines (VM) 10, 12, 14, executing on a single physical server 16. The server hardware is abstracted by a hypervisor 18, such as a VM Ware™ ESX Server™. Of course, any other form of hypervisor, such as the open source Xen™ Hypervisor, could be used and reference to an ESX Server is intended only as an example. Indeed, the present security control system is hypervisor vendor neutral, and design and implementation to support each are possible. Each VM includes its own operating system (OS) 20 (e.g., Microsoft Windows™, Linux™, Unix™, etc.) and one or more application programs 22.

A VM at rest is fully represented by a set of files. These files can be stored on local, direct attached storage (e.g., a hard disk), on networked storage, such as a storage area network (SAN), or on off-line or near-line storage, such as digital tape. To run/instantiate a VM these files are interpreted by the virtualization layer (i.e., the hypervisor), which then dynamically allocates a fraction of the pool of distributed physical resources available to it, to each of the VMs being executed. Running VMs have additional state information stored in run-time memory, cache and registers of various physical devices, and also state-specific files.

A VM can thus be thought of simply as a virtualization application. The state of the VM can be treated as run-time data of the virtualization application, while the configuration of the VM as well as the virtual disk file(s) with OS, application and data, are the data set of the same application. For example, in the VMware Virtual Infrastructure 3, a virtual machine at rest (powered off) is represented minimally by two files:
<vm_name>.vmx and <vm_name>.vmdk.

The VMs are examples of a broader category of constructs called virtual objects (VOs). VOs exist at almost every level of a system and the present inventors will use the term Virtualized Ecosystem to refer to a community of VOs and their physical environment. Logically related collections of VOs (which may include virtual environments) may themselves be regarded as VOs.

Figure 2:
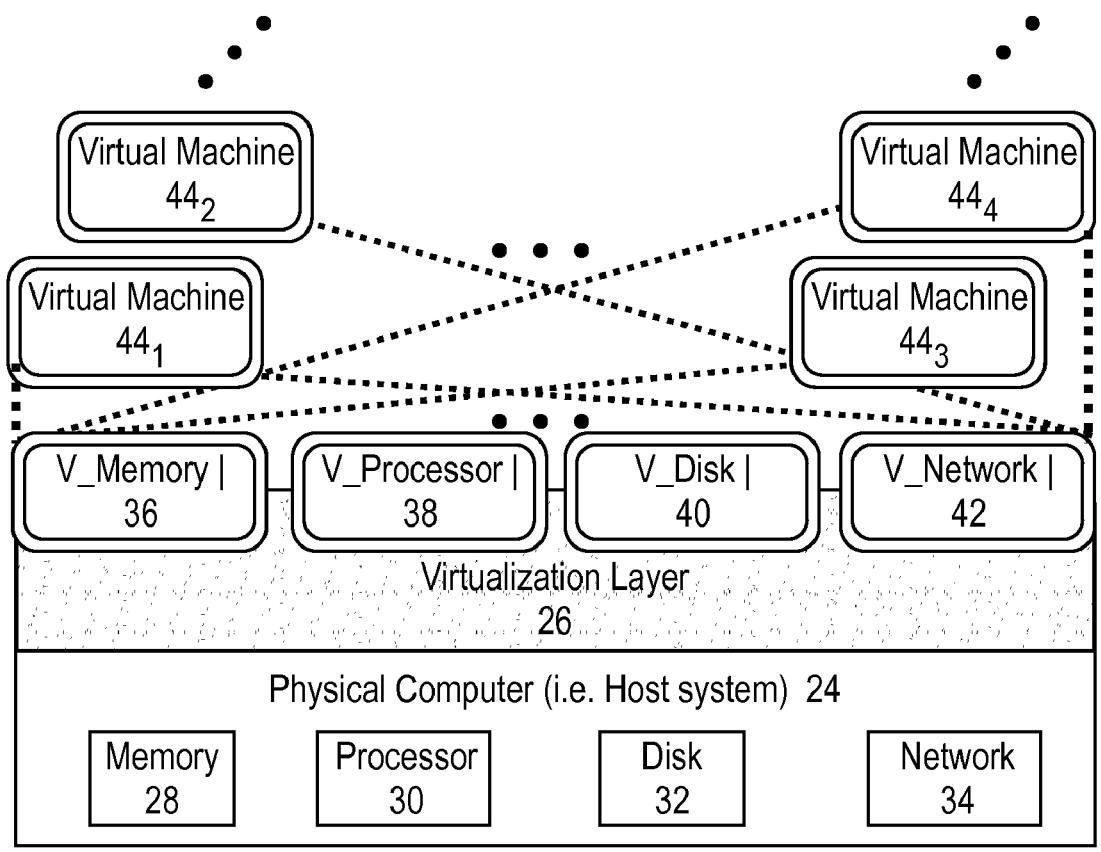
FIG. 2 illustrates an example of a single physical computer system with a virtualization layer and virtualized objects of the system's physical elements.

FIG. 2 illustrates an example of a single physical computer system 24 with a virtualization layer 26, and subsequent virtualized objects of the physical elements such as memory 28, processor 30, disk 32, network 34 and machine 24. The diagram is representative only and is not intended to be an exhaustive representation of all the physical elements and their virtual counterparts (if any). In this illustration the VOs are indicated as V_Memory 36, V_Processor 38, V_Disk 40, V_Network 42 and collectively as a logical unit, V_Machine 44. Other examples of VOs or logical collections of VOs include a virtual switch, a load-balanced cluster, a named data center, a physical or virtual resource pool, and so on.

Of course, each of these VOs may be further decomposed. In terms of present security control system, the level of granularity is that supported by the virtualization technology in use, and its support for exposing the virtualized objects and interfaces for external/third-party manipulation. However, a custom virtualization platform driver/module may be implemented to extend the ability to access and manipulate otherwise unexposed virtualized objects, or even be able to indirectly manipulate all the virtualized objects, removing perhaps the need to add specific controls for those objects.

Figure 3:
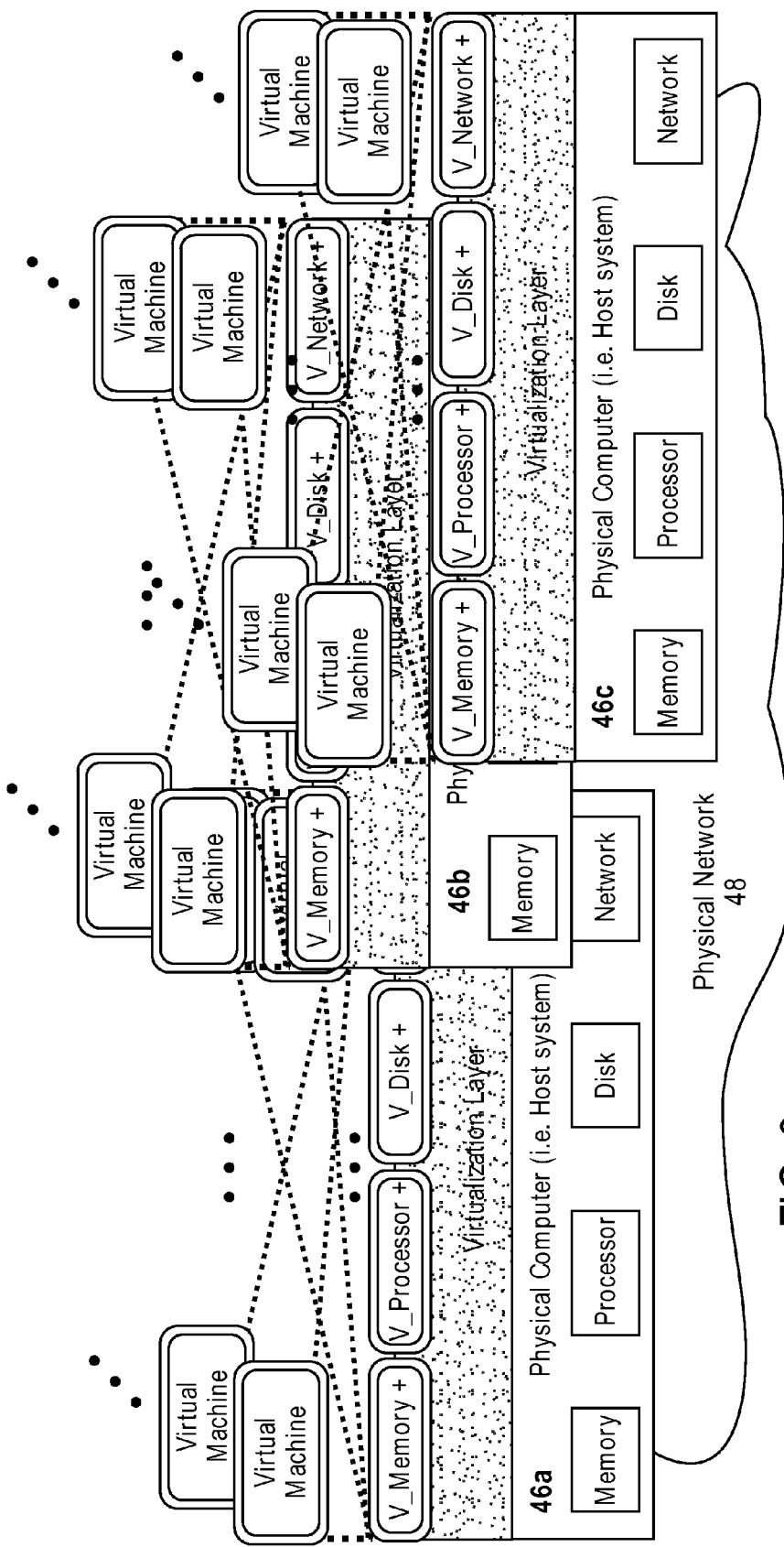
FIG. 3 illustrates an example of a virtualized ecosystem made up of groups of physical computer systems on one or more physical networks.
Figure 4:
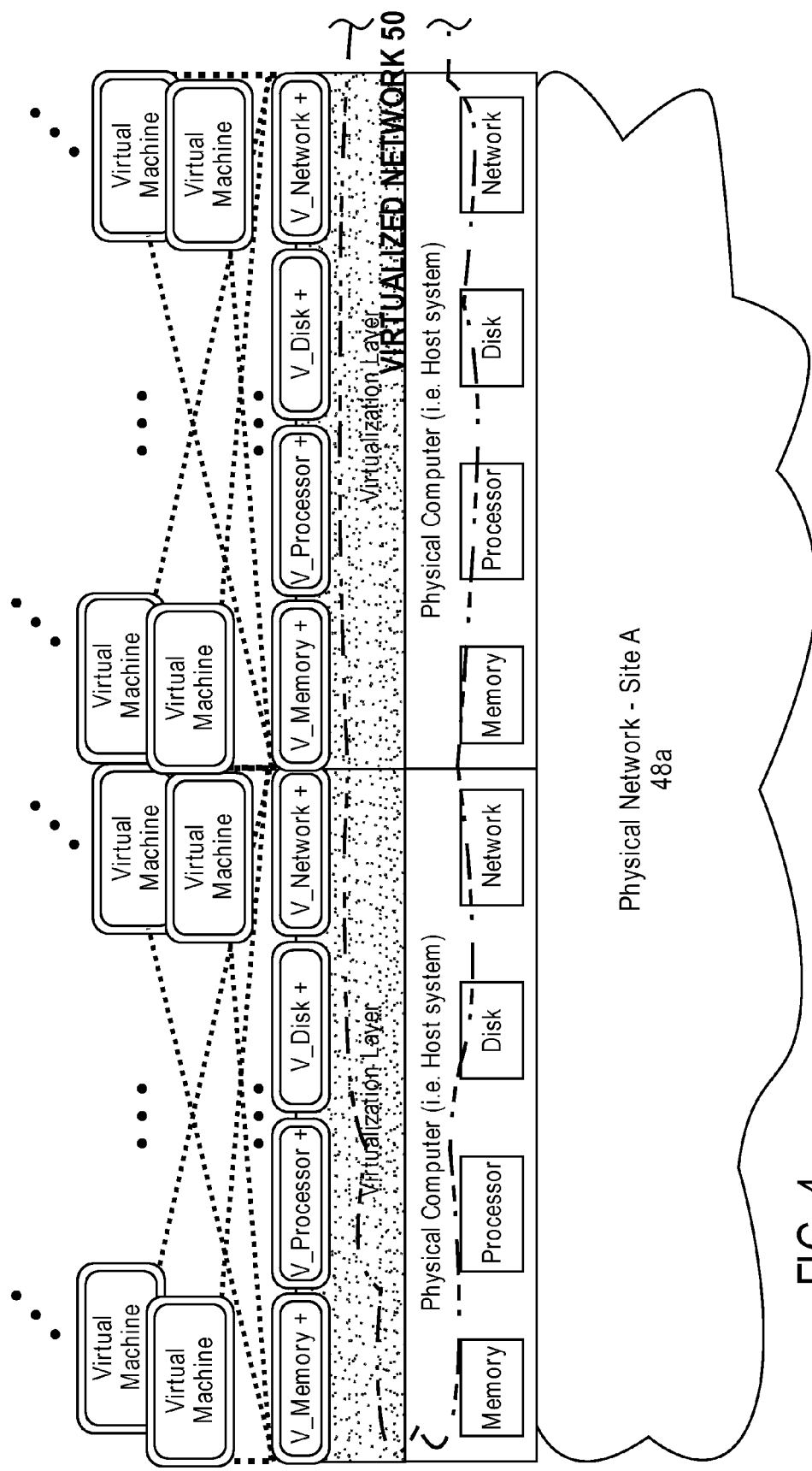
FIG. 4 illustrates an example of a virtualized environment spanning two physical sites.
Figure 4:
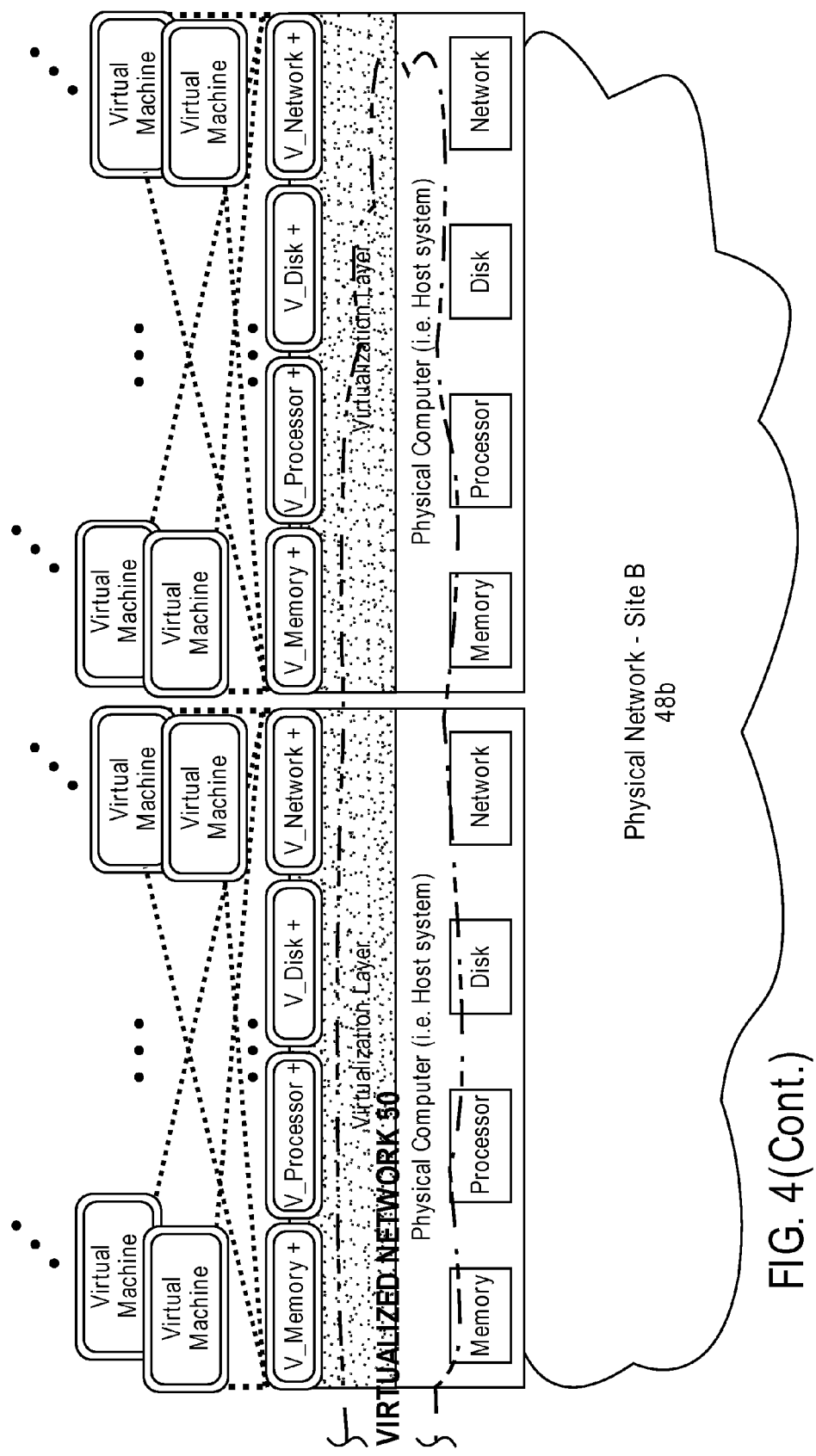

Groups of physical computer systems, 46a, 46b, ... 46n, on one or more physical networks 48 represent a virtualized ecosystem, as shown in FIG. 3. VMs on one physical server running a virtualization layer can move to another via a user input through a management interface or through management automation technologies such as VMware's Distributed Resource Scheduler (DRS) and VMotion™. If the same virtualization technology is used, then a virtual network 50 can be formed across the virtualization layer such that the virtual network has a more complex mapping to the underlying physical networks 48a, 48b, and is much harder to control and manage. For example, as shown in FIG. 4, a virtualized environment may span two physical sites and a virtual machine running on a virtualized physical server in one site can just as easily run on a virtualized physical server in the other site.

Because the virtualization technologies facilitate such a range of capabilities, the present security control system is needed in order to achieve a satisfactory level of robustness, balance and containment within virtualized ecosystems. If we assume that a VO, when it is created, is fully isolated, then the present security system defines, manages and enforces the controls for interactions amongst the VOs and their interactions with the underlying physical environment. As a user or automated agent attempts to manipulate the VOs in the virtualized ecosystem (which is equivalent to executing commands within a virtualization platform), the controls (including entitlements and access/use policies) for the operation are evaluated and enforced at run time depending on the context within which the operation is being performed (i.e., the virtual and physical environment) and the properties of the VOs. The properties of the VOs include controls specifically defined by the present security control system, which may, in one embodiment, execute on the same platform as the security control layer described in co-pending U.S. patent application Ser. No. 12/210,084, filed 12 Sep. 2008, assigned to the assignee of the present invention and incorporated herein by reference (or a complementary platform thereto).

The present security control system has a number of attributes and features, including: means for collecting an inventory and classifying virtual objects and environments; means for automated discovery of a virtual infrastructure to identify VOs and physical and virtual environments already available; means for automated definition of supported controls and the ability to develop actionable ontologies; embedded controls for securely executing VOs within virtual and physical environment contexts; means for providing variable protection of VOs at rest; means for efficiently checking/enforcing controls before a VO can be operated on, instantiated/activated, or moved, etc.; means for cryptographic key management; means for monitoring, logging, and reporting; means for importing and integrating with externally-defined security controls; and means for determining baselines for operations performed by specific users or systems/processes/agents involving particular VOs and environments. Each of these will be explored in detail below.

1. Inventory and Classification of Virtual Objects and Environments.

The Distributed Management Task Force, Inc. (DMTF) has defined various profiles that represent virtual objects and computing infrastructure components in a vendor-agnostic manner. A basic hierarchy of virtual/physical objects has also been defined. For example, DMTF has a virtual computer system profile that represents a virtual machine, and is a subclass of a computer system. The virtualization platform may also have defined its own inventory and classification system. The present security control system may also define its own inventory and classification system based on learning or may augment the definitions provided by DMTF or by the virtualization platforms.

In the context of the present invention, virtual/physical objects are further categorized into base classes, where objects with similar properties are grouped, followed by a taxonomy of the allowed hierarchical relationships of these base classes into higher classes. These classes and taxonomies may be completely independent of other existing definitions or may be augmentation of existing definitions. The present security control system focuses on security and compliance related classifications, but this concept can be applied to other aspects of virtualized ecosystems, such as performance management.

Figure 5:
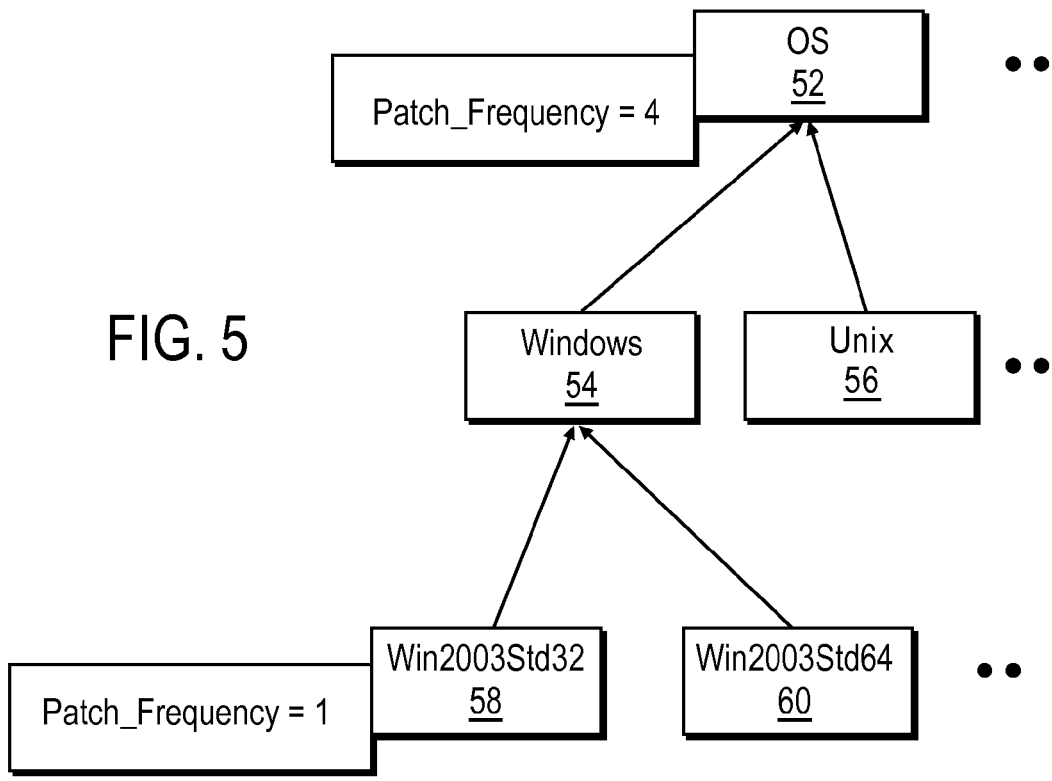
FIG. 5 illustrates an example of a hierarchy of virtual object classifications according to a classification scheme in accordance with the present invention.

As an example of the present classification scheme, consider a class named "windows-2003-std-64bit". Such a class may include all the virtual machines running the Microsoft Windows Server 2003 Standard 64-bit edition. This class would be a sub-class of the "Windows" class, which in turn may be a sub-class of a broader "operating system" class. An example of such a hierarchy is illustrated in FIG. 5. The operating system class 52 of the virtualized ecosystem includes both a Windows sub-class 54 and a Unix sub-class 56. The Windows sub-class includes further sub-classes for windows-2003-std-32bit (58) and windows-2003-std-64bit (60). Thus, classification of VOs to a very fine grain is permitted.

More than just classification, however, the present security control system is able to attach VO controls at any level of the classification hierarchy. For example, the present invention allows for the definition of controls that are specific to a base class or to a higher class. In FIG. 5, a control "frequency of patching" has been defined for specifying how often a VM should check for patches and, if any are available, then to install same. In the illustrated example, the class of VMs that are defined by the property "Win2003Std32" is governed by a control defined for the operating system (patch every 4 weeks) and for its own sub-sub-class (patch every week).

As this example implies, if a control is not defined for a particular sub-class then the sub-class will inherit the control from its parent/grandparent class. Also, the precedence order is depth first, so if a base class (i.e., one which has no further sub-classes depending from it) has a control defined, that control takes precedence over any controls defined further up in its hierarchy. This allows the present security control system to derive classifications and associated controls for new VMs by interrogating their configuration and contextual properties and then comparing the returned responses to existing classes and finding the closest match.

Additional classifications may be defined where particular properties of the subject VO have specific values. For example, a VM object may have an associated risk level, depending on the sensitivity of applications running thereon and the risk posed to the business in the event of failure or compromise. The risk levels will detail certain specific requirements that the VM must meet. For example, a VM classified as risk level 2 may have to have every component patched and up-to-date according to a specified schedule, may have to have configuration settings of every component to secure, may be restricted such that users can only access the VM and applications running in it with a level 2 authentication mechanism and to run only on specified hosts, and so on.

In accordance with the present invention, each classification is identified through an associated label. For example, a "Purpose" class hierarchy may be defined; Experimental (e.g., for a laboratory, quality assurance or development environment) and Production (e.g., for a company- or customer-facing environment). Both may be sub-classes of, say, ACME Inc., a company-wide class at the top of a hierarchy. Then, a VO with, for example, a Purpose label set as "company.purpose=Experimental" would only be permitted to exist in an Experimental environment (e.g., in a laboratory, quality assurance or development environment), and not in any of the Production environments. Note, in this and the following examples, "company" is a label that may be used to identify the vendor of the security control system, but in other instances may be any convenient label selected to avoid name collisions with other controls/properties defined by other system vendors, and such that it is recognized and enforced by the security control system. Given that there is a super-class, ACME Inc., none of the VOs in the hierarchy can function outside of an ACME Inc. environment, so that if the protected VO was somehow obtained by an unauthorized party, that party would not be able to instantiate it or read any associated data from the VO.

In one embodiment of the present invention, a data center approach is taken to inventory typical environments, where a physical environment is represented by a set of physical resources with specific characteristics and configuration settings, such as geo-location, configuration for redundancy, availability per services supported, and so on. This is somewhat analogous to typical data center tiers, where everything is defined; from physical resources, to personnel who can access the data center, to change management processes, to selection of hardware, and so on, for each tier.

More formally, the inventory may be expressed in ABNF (Augmented Backus-Naur Form) syntax as follows:
PhysicalEnvironment=PhysicalResourcePool PE-Metadata. A physical environment/data center consists of a physical resource pool and associated meta data; and,
   a.               PhysicalResourcePool=1*(PhysicalResource) PE-Metadata
   b. Physical Resource=(ComputerSystem/StorageSystem/Network System)

A physical resource pool is a collection of physical resources grouped together for a particular purpose. A physical resource may include a computer system, a storage system or a network system, each resource having associated meta-data. Of course, this is only a representational list of physical resources, and additional resources may exist and be controlled by the present security control system. Of particular interest is the associated metadata. In case of PhysicalEnvironment the metadata may include such information as geo-location, legal jurisdiction of the data center and the data center rating. Such information is useful (indeed, sometimes essential) to provide appropriate security controls. Again this is a representational list and, depending on the environment/deployment and security measures required, additional metadata may be defined.

PE-Metadata=1*(GeoLocation/LegalJurisdiction/PE-Tier), where
   a. GeoLocation=City State Country
   b. LegalJurisdiction=1*(Country)

A data center may fall under 1 or more legal jurisdiction depending on the business it engages in or where it is headquartered.
   c. PE-Tier=("1"/"2"/"3"/"4")

As defined by Telecommunications Industry Association specification, 942: Telecommunications Infrastructure Standard for Data Centers, a Tier 1 data center may be a basic data center with no redundancy and 99.67% availability (28.8 hours down per year). A Tier 2 data center may have redundant capacity components and offer 99.75% availability (22 hours down per year). A Tier 3 data center is a concurrently maintainable data center with 99.98% availability (1.6 hours down. per year). A Tier 4 data center is a fault tolerant data center with 99.99% availability (0.8 hours down per year). An additional tier "0" may be defined to represent all environments that do not fall into one of the above rating systems, such as an internal quality assurance laboratory. This is an example of how the present security control system may augment an existing classification definition.

PRP-Metadata=PeakThreshold, where
   a. PeakThreshold is a limit that should not be exceeded in terms of resource utilization.

This is interesting from a security perspective as system outages or pegged systems may be leveraged to launch other attacks or may be a result of an attack.

VirtualEnvironment=VirtualResourcePool VE-Metadata, where
   a. VirtualResourcePool=1*(Virtual_Resource)
   b.               VirtualResource=(V_DataCenter/V_Datastores/V_Host/V_Machine/V_Disk/V_Network/V_Memory/V_CPU)

Implicit in the VirtualResource is a virtual-to-physical device mapping. In certain situations, these mappings may have to be made permanent, meaning no changes are allowed once these virtual resources are mapped. For example, virtual storage mapping to physical storage devices, where these devices may have specialized capabilities such as hardware encryption. In such a case, an appropriate control may be utilized to prevent re-configuring the virtual-to-physical device map, basically making the virtual hardware tamper-proof.

c.   VE-Metadata=1*(SecurityZone/RiskLevel/HostVersion/PatchFrequency), where i. SecurityZone is a security zone label/classification for the subject virtual environment. Resources within this environment may only be utilized by equivalently zoned VOs. For example, if a VM is marked with the SecurityZone equal to "DMZ" then it should only be able to reside in or be activated in a virtual environment that is similarly marked and is mapped to a physical environment that is the "DMZ".

ii. RiskLevel defines the sensitivity of the applications running within the virtual environment and risk posed to the business in case of failure or compromise.

iii. HostVersion defines the version of the virtualization platform.

iv. PatchFrequency defines the update/patch policy for the subject host.

The above are simply a representative set of classifications and are not intended to be an exhaustive listing thereof. Many more groupings or classifications or criteria may be defined to help contain and control the virtual infrastructure, including classifying new objects for the purposes of security properties inheritance. This may include defining a metric (such as the data center rating tiers) and propagating additional controls based on the "distance" from a particular control requirement. As discussed above, a number of factors and process requirements go into determining the rating of a data center. Similarly, requirements may be defined to describe different tiers of secure virtual environments. Each specific measurable property may be included as a control or as a higher aggregate measurement of several controls, and the "distance" defined and included as a control. The "distance" measurement provides one method of optimization for evaluating the controls during enforcement.

The "distance" measurement may be derived by assigning different weights to various properties of a VO. For example, a VM may support configuring the network settings to allow a promiscuous mode, media access control (MAC) address rewriting or forged transmissions. Each of these settings may be included as controls having specific values, such as "false" to not allow these behaviors in the VM or "true" to allow same. These settings may also be assigned a weighting, for example on a scale of 1 to 10, in terms of security. For example, the promiscuous mode may be weighted 9, MAC address rewriting may be weighted 7, and forged transmission may be weighted 8. Then an aggregate network security control may be calculated to represent all three settings, which aggregate control can then be checked to see if it meets the security policy requirements for the environment before being allowed to run/be activated in that particular virtual environment.

Similarly, "IntentionMaps", the finger-printing of specific environments, can be defined to quickly determine "how close" an environment is to meeting the required controls of a VO. For example, consider a mathematical space consisting of all possible data centers, i.e., each point in that space represents a data center. This is a multi-dimensional space, with each dimension representing say a security, compliance or operational classification. One then may define a metric in such a space to introduce the concept of distance between points. This distance represents how close one data center is to another. That distance, in turn, can be used in determining whether a VO can be instantiated in a new data center if it was previously allowed to operate within a known data center. The data center's properties can be inferred by its "proximity" to a known data center. The metric itself can vary; one embodiment may take the form of a weighted sum of various classification characteristics, such as those mentioned above. This method optimizes the evaluation process of the controls given a specific context.

2. Automated Discovery of a Virtual Infrastructure to Identify VOs and Physical and Virtual Environments Already Available.

Some of the information regarding the physical environment on which a virtual ecosystem is instantiated may be stored in directory services such as Active Directory, or in a domain name system (DNS), asset management system or other device management system, or even in individual configuration files. The present security control system leverages all these information sources as authoritative for their respective managed physical resources.

Most of the information regarding a virtual infrastructure is available through its respective management systems. For example in the case of VMware, most of the information regarding the virtual infrastructure can be retrieved from the Virtual Center™ or through published application programming interfaces (APIs) or other management systems. Any managed object within a virtual infrastructure may be retrieved by the present security control system and further protected. For example, Virtual Center managed objects include data centers, folders, clusters, networks, resource pools, data stores, hosts, virtual machines and templates. The "folder" container allows logical grouping of the virtual objects within an inventory by type, e.g., a folder named "California" allows the data center objects that are physically located in California to be grouped within it.

This information may already have direct correlation (e.g., guest operating system type) to the classification/taxonomies defined or may have to be mapped or augmented by the present security control system. In some cases, no hierarchy may have been defined or perhaps the assigned label for the grouping may have no relevance to security. In these cases, either more controls would be defined (as controls cannot be inherited) (perhaps manually by users), or the information may be ignored by the security control system based on its configuration.

The automated discovery process may depend on the available management systems. For example, where published APIs are available, the security system may make calls through those APIs to retrieve the requested information. Where configuration files exist, the security system may retrieve the information directly from those files. In other cases, device management interfaces may be used to retrieve the necessary information. Where the present security control system is not able to automatically discover relevant information it may allow manual input of information via spreadsheets or other formatted data.

3. Automation of Definition of Supported Controls and the Ability to Develop Actionable Ontologies.

The ability to develop actionable ontologies is largely dependent on the security control system's managed objects, the supported controls and the context in which the objects are running. For example, it may be the case that a particular VO can be instantiated in a particular environment, where the type of environment is perhaps determined by the security and resources needed. In accordance with the present invention, existing (running) virtualized ecosystems are interpreted by the security control system into actionable ontologies, such that subsequent changes to those virtualized ecosystems may be governed more consistently. This includes abstracting the data from known actionable policy into VO controls such that these controls can be restored into enforceable policy at execution time, regardless of virtual or physical environments. Enterprise security policies stored into external systems such as configuration management databases are interpreted into VO controls and thus persisted with the VO, and enforced regardless of changes in the environment.

4. Embedded Controls.

The present invention facilitates the embedding (both logically and literally) of "control blocks" within the virtual objects they govern. These control blocks, which are benign blocks of data that represent a set of controls, may dictate where, when, how and using what resources (physical or virtual) the virtual objects in which they are embedded can operate. In one respect, the embedded control blocks define the "intent" of the subject VO. While the present invention is concerned primarily-with security- and compliance-related controls, the concept of embedded control blocks can be extended to any set of operational parameters or characteristics. For reasons of length, only a few controls will be described herein as examples.

As the name suggests, control blocks that are literally embedded in VOs may be made part of those VOs. Logically embedded controls, on the other hand, may be represented as links to actual controls blocks that are stored in a central repository. This allows for single copies of control blocks to be stored in one location and then referenced by/linked to multiple VOs. For example, if a data center is full of uniform virtual machines then all such VMs may be linked to a single set of control blocks that govern them.

In one embodiment of the invention, an active control block may be represented by executable code that executes when the subject virtual object in which it is embedded is instantiated. Such active control blocks could be used to operationally regulate behavior of the VOs themselves, perhaps based on environmental conditions. For example, the executable code could help enforce the control. Another example is an active control that on instantiation decrypts/unprotects an associated disk file, or performs a vulnerability scan of the VO. Basically, an active control block may be a micro-agent that is dormant when the VO is at rest, and is activated when the VO is being manipulated. The embedded control block becomes active first, and only if the controls allow for the VO operation being performed in that specific environment does the operation succeed.

Controls may be preventative, detective or corrective in nature. A preventative control may make a VO immutable so that configuration settings remain fixed for the life of the VO. For example, the virtual hardware associated to a VM may be fixed and enable non-tampering. A detective control may require vulnerability scanning of the VMs at rest to detect vulnerabilities that were recently exposed in the operating system or applications in the VM. A corrective control may require that the VO be quarantined and remediated before being allowed to be activated in a particular environment.

A simplest control block may have one defined control, which may dictate what, where, when, and using what resources (physical or virtual) the associated VO can operate. For example, a particular VM running a particular application may be allowed to run in a specified environment during specified times using any resources from a designated resource pool. If the business enterprise that is running the application needs additional operating capacity, the virtual infrastructure may be configured to start additional VMs of this type to handle some of the workload. In such a case, those VMs that can run in the defined virtual environment (and thus the underlying physical environment) can be defined by these control blocks and enforced consistently regardless of where the VM is instantiated or however many virtual environments are available. More complex control blocks may represent a set or sets of related controls.

Each control block's relationship to a VO persists for the life of that corresponding VO. The relationship and the applicable control block may be modified as the security and compliance requirements of the environment change. This is somewhat analogous to the roles defined in a role-based access control system. In that case, roles represent a set of users who may fill a particular job. A role is assigned a specific set of privileges and the users' role membership (the "relationship") determines the set of privileges an individual has. In such a system, users are transitive objects (they get created and then deactivated), just like VOs in a virtualized ecosystem. Roles, in contrast, typically exist forever (or at least tend to persist beyond the time they are occupied by a particular user). Similarly, control blocks, exist forever (or at least beyond the life of a particular VO) but their relationships to-VOs vary over-time. This allows decoupling of control block definitions from their use/re-use.

In one embodiment, a control block is simply a set of key-value pairs, or may be represented as an extensible markup language (XML) document. Table 1 presents representative examples of key-value pairs. The values themselves may be in any present security control system supported data structures, for example, binary, string, numerical, range, or more complex structures such as the lifetime period which may be represented by two UTC strings, or the certificate of the signer that is base64 encoded and split across a number of key-value lines, or even embedded executable code. Depending on the structure, specialized parser, encoders and execution environments may be utilized by present security control system.

TABLE 1

Representative examples of key-value pairs for control blocks

| Example Object | Example Controlled Operation | Example security control system control | Example values |
| --- | --- | --- | --- |
| V_Machine (e.g., qa10) | Create PowerOn/Activate Pause Suspend PowerOff/Deactivate/ ShutDown View/Read Copy Move/Archive Destroy/Delete | company.id company.secctrlVersion company.lifeTime<br><br>company.dataSensitivity company.purpose company.patchLevel company.patchFrequency company.networkSecurity company.guestOsType company.containment | = "vm_584d4ddf7b" = "1.0" = "NotBefore: 2008/09/01; Not after: 2009/08/31" = "Internal" = "QA" = "1" = "Every Tuesday" = "Weak" = "RHEL 5" = "False" |

TABLE 1-continued

Representative examples of key-value pairs for control blocks

| Example Object | Example Controlled Operation | Example security control system control | Example values |
| --- | --- | --- | --- |
| | | company.action | = "Observe" |
| | | company.secureDisk | = "None" |
| | | company.digestAlg | = "SHA1" |
| | | company.vmxDigest | = "64 56 32 dd 22 d3 09 . . . " |
| | | company.vmfDigest | = "33 a9 c4 dd e8 29 12 . . . " |
| | | company.vmdkFile1Name | = "winxp.vmdk" |
| | | company.vmdkFile1Digest | = "c3 dd f1 b4 22 a8 99 . . . " |
| | | company.sigAlg | = "SHA1withRSA" |
| | | company.sig | = "df 22 11 dd ed 45 63 dd . . . " |
| | | company.certLines | = "6" |
| | | company.cert | = 'base64-encoded-certificate' |
| V_Network (e.g., hr_network) | Create/Rename Map to physical devices/change mapping Delete | company.mutable | = "False" |
| V_DataCenter (e.g., qa_MV) | Create/Rename View/Read Destroy/Delete Add/Remove Host | company.SecurityZone | = "1" |
| V_Host (e.g., esxq002) | Access/Login Modify/change Turn on Maintenance mode ShutDown Reboot Patch/Update | company.host.ipAddress company.host.name company.host.version company.host.purpose company.legalJurisdiction company.host.geoLocation company.PE-Tier | = "10.223.1.66" = "esxq002.qa.company.com" = "ESX 3.5" = "QA" = "USA" = "Mountain View, CA, USA" = "0" |

Similarly, security controls may be defined for every VO in a virtualized ecosystem as they may influence or impact the overall security posture. To ease management of these security controls per VO, groups can be defined and stored in a directory or other distributed repository that allows a specific control to apply to many VOs. Also, values a particular control may have can be stored in a repository. Table 2 provides examples of such groupings, descriptions and allowed values.

TABLE 2

Examples of groupings, descriptions and allowed values for security controls

| Classification | Description | Example |
| --- | --- | --- |
| purpose | Group of VMs, or virtualization hosts, or clusters, or datacenters that serve a particular purpose. | name = "QA" members = "esxq001.qa.company.com; esxq002.qa.company.com" |
| geoLocation | Allowed geo-locations for both hosts and VMs. | name = "USA" members = "Mountain View, CA; Fairfax, VA" |
| legalJurisdiction | Applicable legal jurisdiction for data export. | "USA, Canada" |
| host.version | Allowed virtualization platform versions. | "ESX3.0; ESX3.5; ESX4.0" |
| guestOsType | Allowed VM/guest operating systems. | "RHEL 4; RHEL 5; Win2003" |
| containment | Restrict VM to current environment? | True or False |
| mutable | VO can be modified after creation? | True or False |
| lifeTime | Duration for which a VO can be active. This allows virtual machines to be "checked out" and used until they automatically expire. Expiration may be achieved through digital signing and encryption features. | "NotBefore: 2008/09/01; Not after: 2009/08/31" |

Whenever a VO is modified its corresponding control block must be updated. The control block may be stored with the VO and may provide persistency for certain controls. In the example of controls above no control was defined within the V_Machine object for the legal jurisdiction or the geo-location. However, the data sensitivity control is set to "internal". Given these controls, the security control system may determine that the VM is allowed to operate in "any country" that is still treated as an "internal" environment. The "any country" restriction is further reduced by first looking up the values of the geoLocation property of the enterprise. In this case the enterprise has data centers in California and Virginia, and then the values of the legal jurisdiction. Thus, based on these evaluation the security control system may determine that the virtual machine may be allowed to run on a host in either of the locations, as they are both in USA.

However, suppose the enterprise adds another data center in Toronto, Canada. Because the security control system evaluation relied on some information stored in an external repository, the next time a user tries to, say, move the VM, the security control system will determine that the VM may operate in any one of the three now allowed geoLocations. This behavior may not be what was intended. In order to not allow dynamic changes to the controls, explicit controls and their values must be persisted with the virtual object via logically or literally embedded controls.

This persistence may be achieved, in the case of VMware, as key-value pairs in the ".vmx" file. In the OVF format, persistence may be achieved by specifying the controls as a required section(s) in the descriptor (".ovf") file. The ".ovf" file is an XML document. In both formats the addition of the present security control system controls does not interfere with normal use of these files, meaning no key-value pair or section conflicts exist. Non-conflict is easily resolved by including a vendor tag (such as "company" in the above examples) in the name of the key in the key-value pairs and in OVF as a vendor section(s).

The controls themselves nay leak information in paranoid environments and may need to be masked. The logical embedding of controls easily supports the ability to mask specific controls via either further limiting access to the controls repository or by utilizing another system to encrypt/decrypt specific controls. By default, the present security control system is configured to assume that the information that may be gleaned from the controls is otherwise available in the environment and thus does not require further masking. However, the security control system does require that:
 a. any changes to the controls be detectable;
 b. the controls can be validated to exist as specified since the time the virtual object became protected; and
 c. the controls are associated with a particular virtual object.

All these requirements are satisfied by digitally signing the controls and the virtual object descriptor file. In various embodiments, conventional RSA or DSA digital signatures may be applied. In the OVF format case, the ability to digitally sign the various files associated to a virtual machine is well defined. A manifest file contains digital digests of each file contained in an OVF package (which is defined as essentially one or more descriptor files, zero or more disk image files and zero or more additional resource files). The digest algorithm used is as specified in the ".cert" file, which also contains the digital signature and associated X.509 certificates. The manifest file is digitally signed which effectively signs the entire OVF package. This is similar to the method used in Java Code Signing Signature validation is as specified in the OVF format.

Digitally signing the descriptor file and having a control "company.mutable" defined enables the virtual objects to become tamper-resistant because the security control system will allow the VOs to function only if the controls and the VO have not been tampered with since creation. For example, by enabling this control the present security control system can prevent a virtual machine configured to use a specific virtual port group to be re-configured to use another port group (e.g., one that may have the promiscuous mode enabled), or can prevent newly added devices from being automatically used or re-configured to be used or remove devices or change interaction with devices or change device connections, and so on. Similarly the configuration of the virtualization platforms themselves may also be locked-down to prevent changes to the physical environment mappings.

The present security control system has to effectively support the same capabilities for say native VMware virtual machine packages, which consist of one or more descriptor files and one or more disk image files. The other hypervisor platforms may define their own native formats, which may also be supported by the present security control system. In the VMware case, the digest algorithm and digest values of the various files associated with the virtual machine are stored in the ".vmx" file. The entire ".vmx" file is digitally signed and the signature stored within the ".vmx" file itself. Signature validation is achieved by stripping/skipping the signature-related key-value pairs from the ".vmx" file and then digesting the rest. The public key/certificate associated to the signing key may also be included in the ".vmx" file, as a base-64 encoded representation. If it is not, then the "company.idHash" may be used to find the associated certificate from a central repository or the present security control system.

For integrity and non-repudiation of the control, the keys used for digitally signing the controls and the virtual object, may be owned and managed by the present security control system. In another embodiment, the keys may belong to individuals who are responsible for the security of the virtualized ecosystem. In one embodiment of the invention, the data is digested and the digest encrypted using a private asymmetric cryptography key to produce the digital signature. The associated public asymmetric cryptography key is used to decrypt the signature and retrieve the digest of the ".vmx" or manifest file. Similar processes may be used to calculate the various digests and then a comparison made of the digest to validate the signature. In general, only a small amount of data is encrypted or decrypted (for example, one SHA-1 digest) so performance optimization of the cryptography used here is not needed, however an optimized implementation of the digest algorithm is recommended.

5. Variable Protection of Virtual Objects at Rest.

In some instances, security controls may need to go beyond control of access and manipulation operations concerning the VO and include prevention or restriction of any operations that might result in unintended data access. For example, both VMware and Xen support the ability to move a running VM to another host if it needs more resources or the original host begins to misbehave. Such moves are generally considered as normal operations and should be facilitated. However, suppose an individual with physical or network access to the storage system can copy a VM (i.e., at rest) onto a portable storage device or another (perhaps heterogeneous) storage system, where ever it may reside (i.e., different physical environments). Such a situation may not be regarded as a normal operation and the present security control system may be configured to prevent the subject VM from been executed in that different environment.

Figure 6:
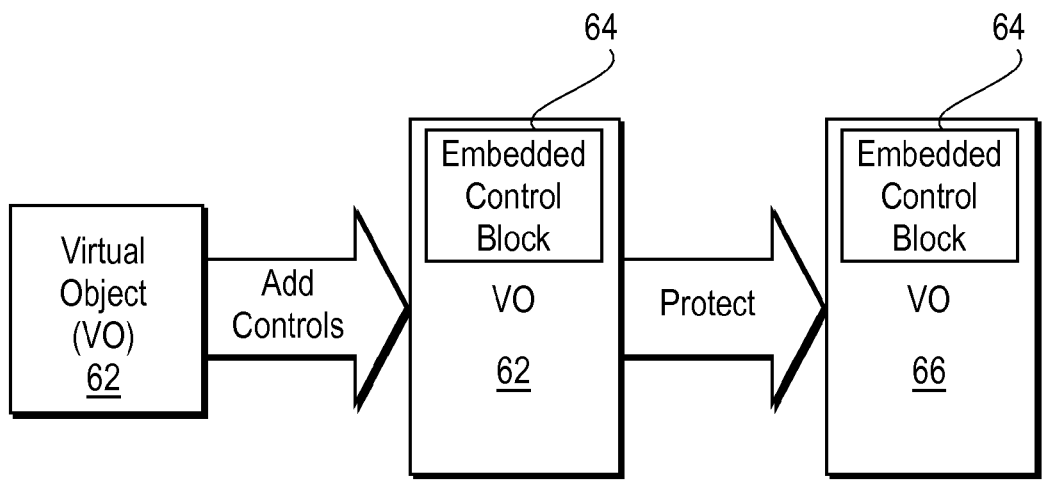
FIG. 6 illustrates an example of a procedure for protecting a virtual object including an embedded control block in accordance with an embodiment of the present invention.

The protection may be provided by selective, full or minimal encryption of associated VM disk file(s). The high level flow is shown in FIG. 6. A subject VO 62 has controls added and these controls are embedded as a control block 64. Then, the VO with its embedded control block is selectively encrypted to produce an encrypted VO 66. This selective encryption mechanism balances the need for data access enforcement and the cost of encryption in terms of speed and increased storage space requirements.

In one embodiment of the invention, variable protection of the disk files associated with the VMs range from little or none, to minimal, to selective, to full, where each protection level is defined as follows.

a. none—no encryption, the disk files are stored in the clear;
b. minimal—only the boot sector and boot sector map are encrypted;
c. selective—various schemes are defined to determine which data is encrypted, including random and tagged-content; and
d. full—the entire set of associated disk files are encrypted.

The level of protection may be specifically set by a network administrator or automatically set by the present security control system depending on the environmental context of the VM being created or an existing VM being brought under present security control system management. For example, if the VM being created is tagged with an existing classification, then the present security control system can interrogate the "company.secureDisk" control setting of other similar VMs and include a similar level of protection. The process for automatically determining a protection level may rely on the most stringent setting for a group of related VMs. That is, for a group of similar VMs the highest protection level may be determined and that level of protection selected to be the protection level for all new VMs in the group. This behavior may be configured differently in another embodiment, such that the present security control system elects the weakest setting for newly created VMs in a particular group.

In one embodiment of the invention, a symmetric key cryptographic system is leveraged to provide encryption of the data. Cryptographic algorithms such as 3DES and AES are suggested. Additional control parameters may be defined to achieve balance between the strength of the encryption versus the performance and storage impact. These tuning parameters, for example the key size, may be automatically determined by the level of protection, the context in which the associated disk files reside, the size of the disk files, whether or not cryptographic acceleration hardware is available, and so on. These tuning parameters and any other cryptographic material are persisted in the associated disk file(s) according to the nature of the virtualization technology and available APfs.

Figure 7:
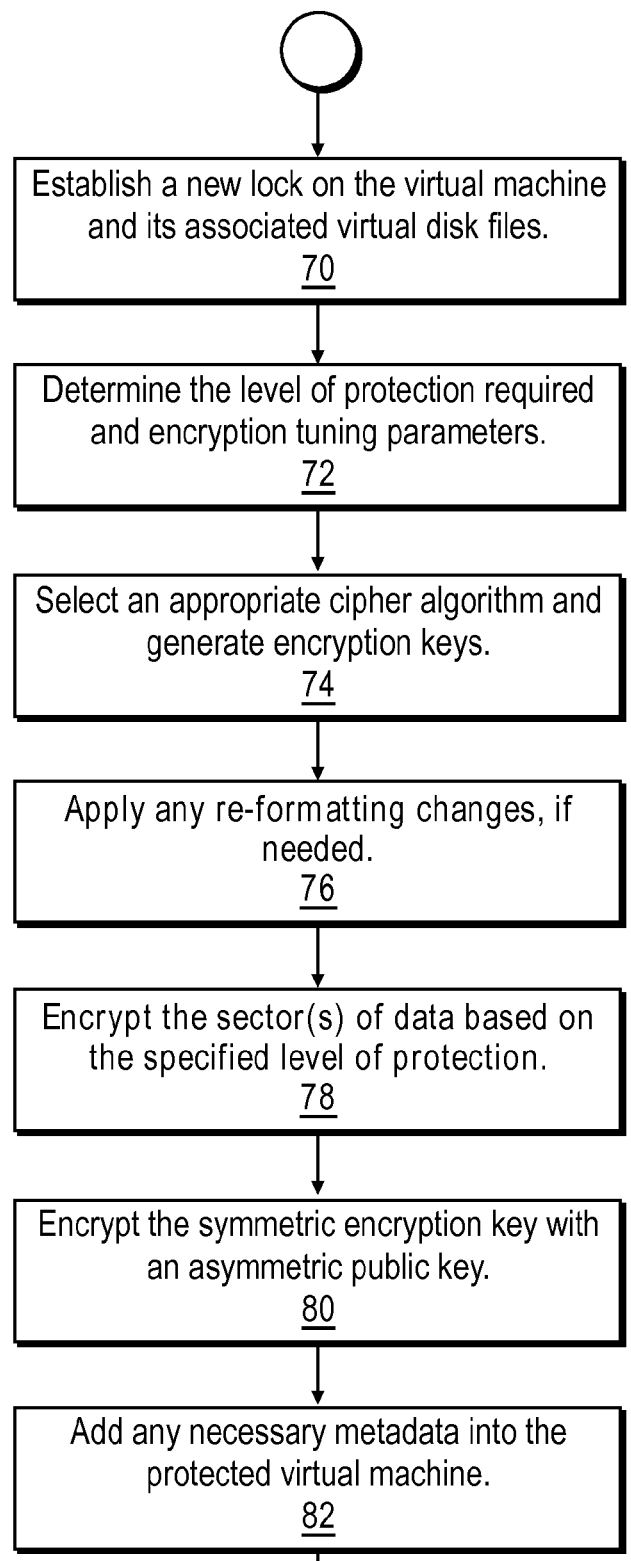
FIG. 7 illustrates one exemplary process for protecting a virtual machine in accordance with an embodiment of the present invention.

Preferably, the symmetric cryptographic key is generated each time the encryption is performed. The virtual machine disk files may be re-encrypted each time the machine is powered off and decrypted either when the virtual machine is powered on or when the virtual disk sector is accessed (a process that may be referred to as just-in-time decryption prior to the data being accessed). One exemplary process 68 for protecting the virtual machine is recited below and illustrated in FIG. 7, however, various modification or enhancements to this process, including re-ordering of the steps, may be made.

a. On power off of a virtual machine or on selecting to bring an existing un-protected virtual machine under control of the present security control system, establish a new lock on the virtual machine and its associated virtual disk files (70). This prevents other systems from accessing the virtual machine while the security control system enables the protection.
b. Determine the level of protection required and encryption tuning parameters (72).
c. Select an appropriate cipher algorithm (e.g., AES) and generate encryption keys given the tuning parameters (74).
d. Apply any re-formatting changes needed (76), if any, such as removing all intermingled zero data blocks or de-duplication of data. This may be provided by the present security control system or by a third party storage system such as Data Domain de-duplication storage system.
e. Encrypt the sector(s) of data based on the specified level of protection (78).
f. Encrypt the symmetric encryption key with an asymmetric public key; only those with access to the corresponding private key will then be able to decrypt the protected virtual machine (80). The ownership and management of both the symmetric keys and the asymmetric key-pairs is described in the Key Management section below.
g. Add the necessary metadata, including the identity/location information of the owner/protected asymmetric key, and the encrypted symmetric key into the protected virtual machine (82).

Figure 8:
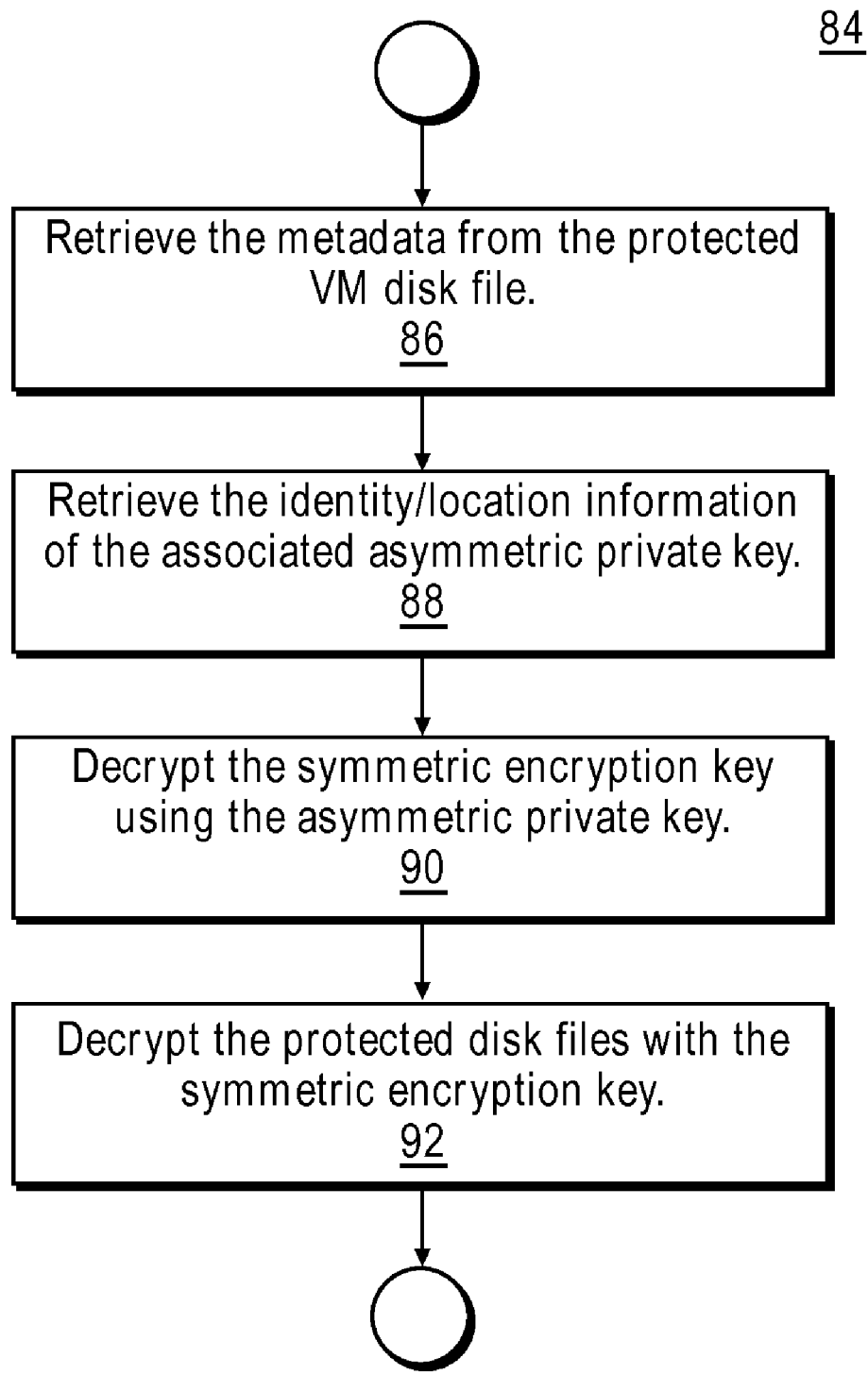
FIG. 8 illustrates one exemplary process for un-protecting a virtual machine in accordance with an embodiment of the present invention.

On powering on the protected VM, assuming the other controls are checked and it is allowed to power on in the given environment, the following process 84, see FIG. 8, essentially un-protects the VM.

a. Retrieve the metadata from the protected VM disk file (86).
b. Retrieve the identity/location information of the associated owner/protected asymmetric private key (88).
c. Decrypt the symmetric encryption key using the asymmetric private key (90).
d. Decrypt the protected disk files with the symmetric encryption key (92).

The identity/location of the owner/protected asymmetric key may be codified as a uniform resource locator (URL) to allow access to a distributed, highly available repository. Of course, the asymmetric private keys themselves have to be protected and that may be achieved using specialized third-party hardware that protects keys in hardware and only allows access to properly authenticated users or system agents/processes. In some embodiments, the present security control system may also leverage natively supported encryption capabilities of storage systems via either API calls or an agent/process.

6 Control Validation and Enforcement

As discussed above, before any VO can be operated on, instantiated/activated, or moved, etc., the associated controls are checked and enforced. But the controls themselves are digitally signed and so may be contained in the virtual object descriptor file and so before any controls can be enforced the security control system must check the integrity of the controls (i.e., ensure that the controls have not been tampered with). This is achieved by validating the signature applied to the controls.

If a digital signature is not present, or is invalid, the security control system may be configured to take certain action. For example, the security control system may be configured to quarantine the VO and subject it to further scrutiny before continuing.

In some instances, a signature may be invalid because the associated public key/certificate may have expired or been revoked. Different behaviors of the present security control system can be configured for each of these situations, for example, in case of an expired certificate, the security control system may be configured to continue because the controls were valid at the time of signing (when the keys were still valid) so the controls should still hold. On the other hand, in the case of revocation the keys were compromised, so it may not be safe to assume that the controls are still legitimate, and the present security control system may block and quarantine the VO.

Once it is determined that the controls are what they should be, enforcement is achieved by evaluating the "intentions"

specified in the controls and their context (i.e., the operation being performed and the "environment" in which it is being performed). The context may include other aspects such as date and time, the resources available, and whether it is a customary operation being performed on the VO or not, and so on. Because the controls are embedded with the VOs, the policies of sufficient control can be reconstructed even when the virtual machines are brought up in an environment where centralized enforcement is not available.

By way of example, suppose a particular VO (vm__12343535) running an application (say a human resource (HR) application) is only allowed to run in a designated environment (hr__42323) during business hours using any resources from a specified resource pool (resource__pool_peakLoad). At all other times the VO should be offline and secured. The embedded controls may include:

company.id="vm__12343535"
company.secctrlVersion="1.0"
company.lifeTime="NotBefore: 2008/08/25; NotAfter: 2009/08/31"
company.activeTime="Monday-Friday; 0800 to 1700"
company.dataSensitivity="Internal"
company.purpose="HR"
company.patchFrequency="Weekly"
company.vulnerabilityScan="Weekly"
company.networkSecurity="High"
company.containment="True"
company.environment="hr__42323"
company.action="Block"
company.secureDisk="Full"
company.digestAlg="SHA1"
company.vmxDigest="dd 33 e4 56 a2 aa 23 45 . . . "
company.vmdkFile1Name="vm__12343535.vmdk"
company.vmdkFile1Digest="ff 12 32 f3 f2 55 6a d4 . . . "
company.sigAlg="SHA1with RSA"
company.sig="ed 44 62 38 91 42 45 f3 b6 c1 . . . "
company.certLines="3"
company.certLine1="MllBgjCCASwCAQQwDQYJK-oZlhvcNAQEEBQAwODELMAkGA1UEBhMCQV-UxDDAKBgNV"
company.certLine2="DCsU08vL2bvSwJrPEqFlkDq3F-4M6EGutL9axEcANWgbbEdAvNJD1dmEmoWny27Pn"
company.certLine3="IMs6ZOZB"

Then suppose that during the day, during normal operation, the virtual infrastructure determines it needs additional resources to cope with the workload.

In the above scenario, the evaluation of the security controls given the specific "context" is done by dynamically pulling together the control information related to the context and comparing the controls set in the virtual object. Developing concrete control maps from the dynamically generated ones and persisting them may achieve performance optimization of the evaluation. Then the next time a similar evaluation needs to be performed the persisted concrete control maps may be simply checked.

The context may consist of the following aspects.
 a. User=Individual or System/Process/Agent.
 b. VirtualObject=uniquely identified VO, e.g., in VMware VI 3 it may be the GUID assigned to the virtual object managed by Virtual Center.
 c. What=An operation that is mapped to specific roles where the VO is running with the privileges of that role, or a specific set of operations allowed on this VO. For example if the VO is a V_Machine then the operations may include one of the following: Create, PowerOn/ Activate, Pause, Suspend, PowerOff/Deactivate/Shut-Down, View/Read, Copy, Move/Archive, and Destroy/Delete, as described above.
 d. Where=specific virtual environment, for example hr__42323. This is the label for a group of virtualization hosts and related resources that may be stored in Active Directory or in Virtual Center, together with their associated metadata.
 e. With what=specific virtual resources, for example, the resource pool labeled "resource_pool_peakLoad".
 f. When=time period, for example, during business hours which maps to "8 am to 5 pm" regardless of the time zone/geo-location.

One of three responses may be the result of a control evaluation, allow, deny or inconclusive. In the case of deny or inconclusive, the administrator may elect to still allow the operation but log the activity or block the operation completely.

The "company.action" control allows configurable security control system behavior for what to do after evaluating a control depending on the result. The values may include "observe" and "block" as first order behaviors that may be further augmented by additional governance rules into say "observe and log", "observe, alert and log", "block and lockdown", "block and archive" and "block, quarantine and remediate, then observe", so on.

The present security control system may be implemented such that certain capabilities are provided in a physical appliance form factor combined with other aspects provided by an agent or virtual machine residing on a virtualization platform or storage system. The architectural split of what is performed where depends on network bandwidth consumption, performance, the hypervisor platform and exposed APIs, and similar constraints.

Figure 9:
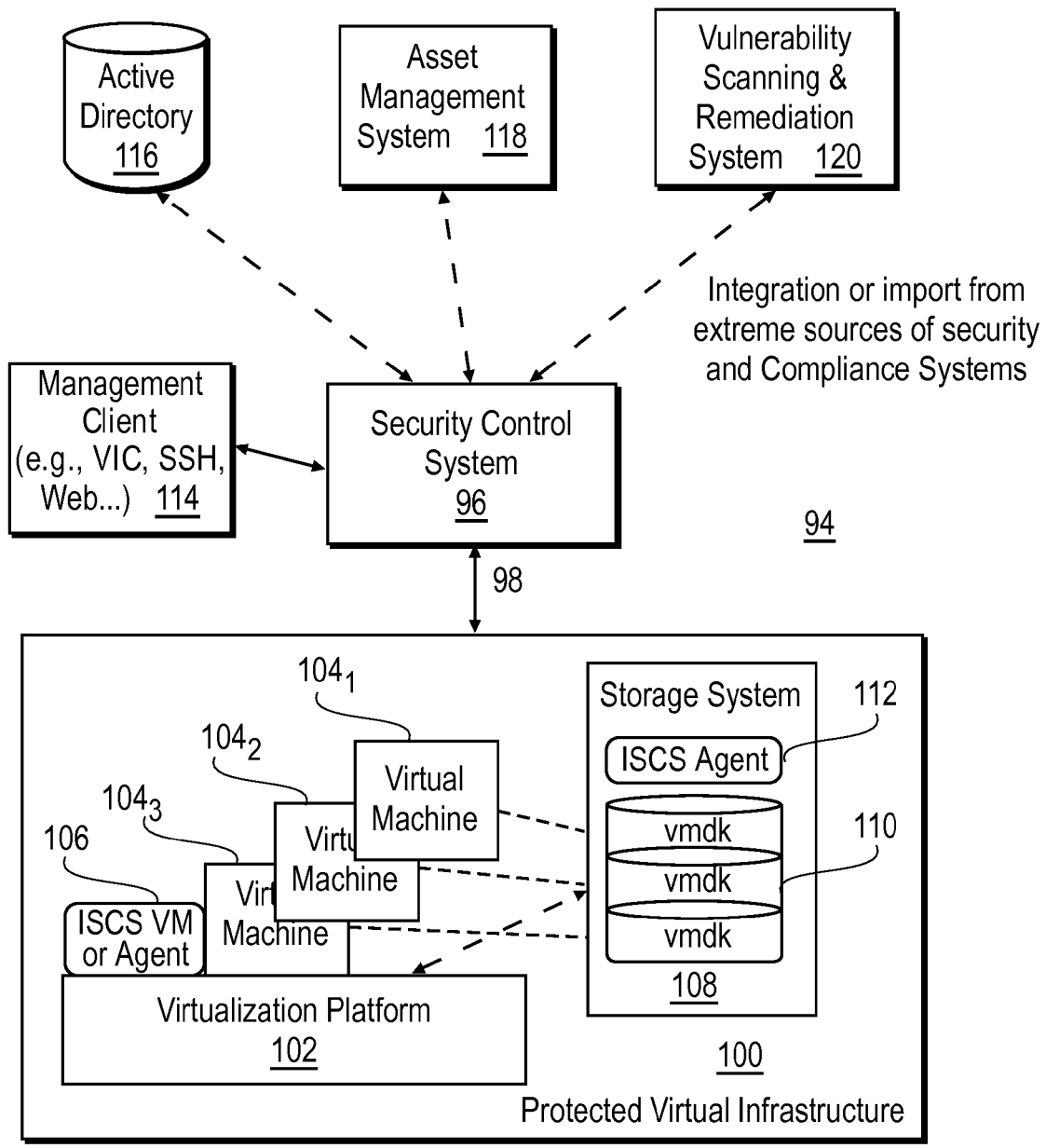
FIG. 9 illustrates an exemplary system which includes a security control system configured in accordance with an embodiment of the present invention.

FIG. 9 illustrates an exemplary system 94 which includes a security control system 96. The security control system is communicatively coupled (e.g., via one or more networks 98) to a virtual infrastructure 100. The virtual infrastructure may include any number of virtualization platforms 102, for example VMware ESX servers, each supporting a number of VMs $104_1$-$104_3$. Associated with each virtualization platform is a security control system agent 106, which itself may run as a VM on the virtualization platform. The virtual infrastructure also includes a storage system 108 that includes a number of virtual disks or other storage devices 110 and an associated security control system agent 112. The present security control system may exert control over the facilities of the virtual infrastructure through agents 106, 112.

In some cases, the security control system 96 may also communicate with the virtual infrastructure or individual VOs through management clients 114 native to the virtual infrastructure or the VOs. For example, VMware provides a rich set of APIs including VI SDK, VMSafe API and VDDK that allow the present security control system to support indirect object manipulation via issuing hypervisor commands natively or over the network, and possibly even implementing a specialized hypervisor driver. Further, the present security control system may import and integrate with a number of third party systems (such as Active Directory system 116; asset management system 118 and vulnerability scanning and remediation system 120) to provide holistic security and compliance of the virtualized ecosystem.

7. Key Management

The cryptographic keys used for the identity, digital signature and/or encryption processes discussed above may be managed by the present security control system. Alternatively, the keys may be managed by an external service and made available to the security control system as needed. At a minimum the security control system may require the keys to be available in a secure, distributed fashion, and the management capabilities should include discovery, sharing/delegation of keys, establishing trust relationships to enable validation in and across different environments, protection and archival of keys, and life-cycle management including revocation.

As indicated above, the digital signatures used in the present system require an asymmetric encryption key pair (e.g., an RSA or DSS key pair). These key pairs may belong to an individual user, a role or to the present security control system as a whole. For non-repudiation of the signature, the private key must remain in the "sole" control of the owner. In the case of the key belonging to a role which is shared by many individuals or to the security control system, additional access and audit controls may be needed to provide evidence of who used the private key to digitally sign the VOs.

If individuals own these signing keys then the security control system may make use of conventional systems to access the private key and perform the signatures. All aspects of life cycle management of these keys, including revocation and archival, would be handled by the conventional key management systems. The public keys are public and may be stored as certificates in a central repository such as an LDAP or Active Directory server. Thus validation is accomplished by retrieving the associated certificate and public key and performing the signature validation as described earlier.

For security control system- and role-owned key pairs, the present security control system may provide life-cycle management, including generation of keys and corresponding certificates, secure storage, revocation, expiration/renewal, and archival, or may rely on a third party product such as a Microsoft Certificate Authority.

The symmetric encryption keys may be generated by the present security control system or the virtualization technology or a third party product. The properties of the keys, such as encryption algorithm (e.g., 3DES or AES), key size, initialization vector, etc., may be provided by the present security control system. These keys may have a short or a very long lifetime depending on the use, which in turn as implications on their size. For example, if the key is used to protect a virtual machine that is activated typically every day to help manage peak workload then the lifetime is short as every time the virtual machine is powered off a new key would be generated and the VM would be "re"protected with that new key. In another example, say the virtual machine is being archived, then the key would have a long life as the VM may not be accessed ever again. A key with a shorter key length is easier to break.

Key archival and escrow may be provided by generating a separate, dedicated key-pair for each purpose. Then, when a VM is archived, effectively archiving the key, it is encrypted with the archival public key and then persisted with an encrypted object. If and when the archived object is activated, the archival private key would be used to decrypt the symmetric encryption key and that key used to decrypt the virtual machine disk files. Key escrow may be enabled to always have access to all the protected virtual machines regardless of who protected them.

8. Monitoring, Logging and Reporting.

Monitoring, logging, reporting and real-time visibility are provided by the present security control system or by another security appliance, such as that described in the above-cited patent application, to assure that robustness, balance and containment are achieved. All manipulations of the VOs, as well as changes to the control block associated with each VO, are logged. Reports by protected objects, specific security controls and so on may be useful to the security control system users and provide trending information, which could result in the definition of additional controls. Actions/Outcome enforced by the security control system vary and may be defined by the embedded control, by the environment or both. Examples include allow, deny, log and alert, quarantine until remediation, block, remediate, lock, scan, and so on.

9. Importing and Integrating with Externally Defined Security Controls.

Such importing and integration may be achieved by abstracting the data from other sources of security control and policy information (such as Microsoft Active Directory, DNS, or Oracle Aqualogic Business Process Management Suite) as persistent controls within a VO control block, and/or as dynamic controls during the validation and enforcement of the controls within a VO given a specific context (for example, the context of who, what, where, with what and when). For example, integration with a patch management system, to also patch inactive VMs if a control is defined to allow patching and the patch frequency, may be provided. For active VMs, the patch management system may have an agent running, which agent can monitor the frequency and patch as needed. For the inactive case, the security control system can check the control and, if the allowed constraints are met, then can activate the VM and allow the patch management system to patch, and then de-activate the VM. Controls may also be imported from other deployed instances of the present security control system. If community sharing is enabled, the control settings to achieve particular security or compliance requirements may be shared with an instance of the present security control system running in the "cloud". The cloud instance sanitizes and normalizes the information and may provide the control information back to the deployed instances of the present security control system. For example, if an enterprise has to be PCI compliant, it may have the appropriate controls in place that the present security control system may share with the community, such that the shared knowledge becomes a learnt control for other deployments.

Another example of integration is with a vulnerability/virus scanning and remediation system, where, based on the controls, the present security control system may unprotect a VO, allow the scan and any necessary remediation to be performed before re-protecting the VO. The same system provides an excellent example for another system of security and compliance controls, that the present security control system can import policy information from. Typically, these systems maintain an inventory of all the systems on the network, policy information on the level, type and frequency of scanning that should be performed on each of the systems, and the results of the scans and remediation(s) performed. The present security control system may import and persist controls in every VO for some of these policies, or may develop and persist space metric values for environments to optimize evaluations. For example, the present security control system may persist a control each for the level, type, frequency and the last scan time stamp in a virtual machine object. Then, regardless of where the protected VM is moved/copied to, these controls will still be in effect. Even though the vulnerability/virus scanning and remediation system might not be available, the controls would be enforced and appropriate action taken.

10. Baselining.

The present security control system is adapted to baseline what is normal in terms of operations performed by specific users or system/process/agent, involving particular VOs and the environments (including context and time). For example, it may be the case that an HR application performance manager typically powers on an additional HR VM when the peak performance load exceeds 80%. Additional baselining may reveal that this usually happens during business hours. These baselines may be derived from the audit-quality logs maintained by the security appliance described in the above-cited patent application or in combination with the logs generated by the present security control system.

Thus, a security control system adapted to define and analyze object handling security control information and derive from it object properties for each of a number of logical resources involved in the execution of a virtual machine in any given context within a virtualized ecosystem has been described. It should be apparent to the reader that various embodiments of the present invention may be implemented with the aid of computer-implemented processes or methods (a.k.a. programs or routines) that may be rendered in any computer language and in any series of logical steps performed in a sequence to accomplish the stated purpose. Those portions of the above description that were presented in terms of algorithms and symbolic representations of operations on data within a computer memory were so presented because these are the means used by those skilled in the computer science arts to most effectively convey the substance of their work to others skilled in the art. Such algorithms are, generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a virtualized environment as discussed above. Computer programs which instantiate embodiments of the invention may be stored in or on a tangible computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The processes presented herein are not inherently related to any particular computer or other apparatus. Various systems may be used with the subject processes in accordance with the teachings herein, or it may prove convenient to construct more specialized apparatus to perform the required methods.

What is claimed is:

1. A method for maintaining administrative control over logical assets in a virtualized ecosystem, comprising:
    in response to an attempt to manipulate a subject logical asset of the virtualized ecosystem, evaluating, by a computer-based control system communicatively coupled to an underlying physical, computer-based environment abstracted by the virtualized ecosystem, control information for the subject logical asset of the virtualized ecosystem and of an entity attempting administrative manipulation of the subject local asset, wherein the control information includes contextual, behavioral and environmental attributes of the subject logical asset;
    deriving from the evaluation, contextualized properties of the subject logical asset, wherein deriving the contextualized properties comprises determining whether (i) the entity attempting the administrative manipulation of the logical asset has sufficient rights to perform such manipulation, and (ii) the attempted administrative manipulation of the subject logical asset will result in a permissible communicative coupling with other logical assets of the virtualized ecosystem or permissible interaction between the subject logical asset and the underlying physical, computer-based environment, thereby determining whether the administrative manipulation is permissible; and
    enforcing, by the control system and according to the determination, controls for the subject logical asset to permit or deny the attempted administrative manipulation.

2. The method of claim 1, wherein the controls are derived from existing controls for like logical assets of the virtualized ecosystem.

3. The method of claim 1, wherein the controls are inherited from like logical assets of the virtualized ecosystem.

4. The method of claim 1, further comprising enforcing learned behaviors for the subject logical asset, said behaviors being learned from systems external to the virtualized ecosystem.

5. The method of claim 4, wherein the systems external to the virtualized ecosystem comprise instances of systems having control systems configured to share information with the computer-based control system for the virtualized ecosystem as part of a virtual community.

6. The method of claim 1, wherein logical and physical assets of the virtualized ecosystem are categorized so that assets with similar properties are grouped together.

7. The method of claim 6, wherein a taxonomy of allowed hierarchical relationships of the groupings defines higher groupings thereof 8. The method of claim 6, wherein various ones of the assets inherit similar ones of the controls according to the groupings.

9. The method of claim 6, wherein the groupings are made according to similarities determined by defined metrics for the assets within the virtualized ecosystem.

10. The method of claim 9, wherein the controls are defined for the groupings within the taxonomy of allowed hierarchical relationships.

11. The method of claim 10, wherein the taxonomy of allowed hierarchical relationships are learned from the virtualized ecosystem.

12. The method of claim 10, wherein the taxonomy of allowed hierarchical relationships are imported from existing systems and subsequently augmented.

13. The method of claim 1, wherein properties of the subject logical asset and the underlying physical, computer-based environment are automatically discovered through available interfaces and management clients for the virtualized ecosystem.

14. The method of claim 1, wherein the controls are literally embedded as control blocks within the subject logical asset, said controls dictating where, when, how and using what resources the subject logical asset can operate within the virtualized ecosystem.

15. The method of claim 1, wherein the controls are logically embedded as control blocks within subject logical asset, said controls dictating where, when, how and using what resources the asset can operate within the virtualized ecosystem.

16. The method of claim 1, wherein logical assets at rest in the virtualized ecosystem are encrypted according to a varying level of protection that depends on an environmental context of the logical assets.

17. The method of claim 1, wherein the controls are enforced after being validated.

18. The method of claim 17, wherein the validation includes verifying digital signatures associated with the controls.

19. The method of claim 17, wherein the enforcement is achieved by evaluating intentions specified in the controls, operations on the subject logical asset being performed and environments in which they are being performed.

20. The method of claim 19, wherein prior to enforcement, the operations and environments are baselined to derive normal behaviors for the controls and subject logical asset.

21. The method of claim 1, wherein the control information comprises security and compliance control information that influences or impacts security of the virtualized ecosystem.

22. A system, comprising one or more computer-based resources hosting a virtualized ecosystem that abstracts physical instantiations of an underlying computer-based environment and a control system communicatively coupled to the one or more computer-based resources hosting the virtualized ecosystem, the control system configured for administratively securing logical assets of the virtualized ecosystem by evaluating attempted manipulations of the logical assets in the context of control information for the subject logical assets and entities attempting administrative manipulation of the subject logical assets, and for determining, for each of the attempted manipulations and subject logical assets within the virtualized ecosystem, whether to permit or deny the attempted manipulation, thereby determining whether the administrative manipulation is permissible, wherein the control information includes, for each subject logical asset, contextual, behavioral and environmental attributes concerning controls for interactions amongst the logical assets and their interactions with the underlying computer-based environment abstracted by the virtualized ecosystem.

23. The system of claim 22 wherein the logical assets comprise one or more virtual objects executing on one or more virtualization platforms, and the control system is architecturally split so that at least some of said virtualization platforms have associated control system functionality.

24. The system of claim 23 wherein the virtualized ecosystem further includes a storage system used by at least some of the virtual objects, said storage system having its own associated control system functionality.

25. The system of claim 22 wherein at least some of the logical assets comprise virtual objects communicatively coupled to the control system through one or more management clients of a virtualization platform on which the at least some of the virtual objects execute.

26. The system of claim 22, wherein the control system is configured to enforce learned behaviors for the logical assets, said behaviors being learned from systems external to the virtualized ecosystem.

27. The system of claim 26, wherein the systems external to the virtualized ecosystem comprise instances of systems having control systems configured to share information with the control system for the virtualized ecosystem as part of a virtual community.

28. The system of claim 22, wherein logical and physical assets of the virtualized ecosystem are categorized so that assets with similar properties are grouped together.

29. The system of claim 28, wherein a taxonomy of allowed relationships of the groupings defines other groupings thereof 30. The system of claim 28, wherein various ones of the logical and physical assets inherit similar ones of the controls according to the groupings.

31. The system of claim 28, wherein the groupings are made according to similarities determined by defined metrics for the logical and physical assets within the virtualized ecosystem.

32. The system of claim 29, wherein the controls are defined for the groupings within the taxonomy of allowed relationships.

33. The system of claim 29, wherein the taxonomy of allowed relationships are learned from the virtualized ecosystem.

34. The system of claim 29, wherein the taxonomy of allowed relationships are imported from existing systems and subsequently augmented.

35. The system of claim 22, wherein the virtualized ecosystem has one or more interfaces and the control system is configured to automatically discover properties of the logical assets and the underlying physical, computer-based environment through said interfaces.

36. The system of claim 35, wherein the controls are logically embedded as control blocks within the logical assets, said controls dictating where, when, how and using what resources the logical assets can operate within the virtualized ecosystem.

37. The system of claim 35, wherein the controls are literally embedded as control blocks within the logical assets, said controls dictating where, when, how and using what resources the logical assets can operate within the virtualized ecosystem.

38. The system of claim 25, wherein the control system is configured to encrypt logical assets at rest in the virtualized ecosystem according to a varying level of protection that depends on an environmental context of the logical assets.

39. The system of claim 22, wherein the control system is configured to validate the controls before enforcing the controls.

40. The system of claim 39, wherein the control system is configured to validate the controls by verifying digital signatures associated with the controls.

41. The system of claim 39, wherein the control system is configured to enforce the controls by evaluating intentions specified in the controls, operations on the logical assets being performed and environments in which they are being performed.

* * * * *